United States Patent [19]
Hutchinson

[11] Patent Number: 5,526,039
[45] Date of Patent: Jun. 11, 1996

[54] RELATIVITY STEREO SCAN

[75] Inventor: J. Andrew Hutchinson, Lorton, Va.

[73] Assignee: The United States of America as represented by the Secretary of the Army, Washington, D.C.

[21] Appl. No.: 307,209

[22] Filed: Sep. 16, 1994

[51] Int. Cl.$^6$ .......................... H04N 13/00; H04N 13/04
[52] U.S. Cl. ................... 348/47; 348/46; 348/44; 348/51
[58] Field of Search .................. 348/47, 48, 49, 348/139, 140, 141, 44, 43

[56] References Cited

U.S. PATENT DOCUMENTS

| | | | |
|---|---|---|---|
| 4,736,246 | 4/1988 | Nishikawa | 348/47 |
| 4,809,065 | 2/1989 | Harris et al. | 348/44 |
| 4,829,373 | 5/1989 | Leberl et al. | 348/44 |
| 4,943,821 | 7/1990 | Gelphman et al. | 354/99 |
| 5,084,763 | 1/1992 | Naradate et al. | 348/47 |
| 5,151,821 | 8/1992 | Marks | 348/44 |
| 5,296,926 | 3/1994 | Nagura | 348/43 |

Primary Examiner—Thai Q. Tran
Assistant Examiner—Anand S. Rao
Attorney, Agent, or Firm—Milton W. Lee; Alain L. Bashore; Anthony T. Lane

[57] ABSTRACT

An observation technique for observing relativistic phenomena by time-like separated viewing, so as to achieve the enhanced perception as a relativistic phenomena, and its simulation technique. The observation technique includes placing two or more observation devices at time-like separated positions, obtaining data from each device, and viewing the data in stereo such that there is displayed the relativistic phenomena by time-like separated viewing. The simulation technique includes viewing a non-relativistic phenomena with at least one viewing device, obtaining a data vector stream at a set rate, dividing each data vector into slices, and generating two separate data vector streams for stereo viewing utilizing sequential slices of each data vector steam such that there is displayed a simulation of relativistic phenomena for time-like separated viewing.

2 Claims, 2 Drawing Sheets

Time

Left Eye   Right Eye

RELATIVITY STEREO SCAN

BACKGROUND OF THE INVENTION

1. Field of the Invention

The present invention generally relates to simulation method and more specifically, to a method for the enhanced perception of relativistic phenomena by its simulation thereof.

2. Description of Prior Art

A theory of physics commonly referred to as Einstein's theory of relativity involves a profound analysis of time and space leading to a generalization of physical laws, with far-reaching implications. The postulates forming the basis for what is known as the special theory (which Einstein called the principle of relativity and the principal of the constancy of the velocity of light), can be stated respectively as the following postulates:

(1) The analytical form of physical laws is the same in all inertial reference systems, and (2) The speed of light in a vacuum is a universal constant. Postulate 1 is a generalization of the Galilean principal of relativity to embrace all phenomena rather than only those of mechanics, which led to the famous formula for mass-energy equivalence. It is postulate 2 together with postulate 1 that represents a radical breaking away from traditional thinking. So as to broaden the above theory to apply to more than just inertial systems, Einstein also developed the principles of equivalence that Einstein made the basis of general relativity: on a local scale the physical effects of a gravitational field are indistinguishable from the physical effects of an acceleration coordinate system.

The implications of the special and general theories of relativity has led to profound conclusions. A new formulation of simultaneity is also intimately connected with postulate 2. Two spatially separated localized occurrences (or events) are simultaneous when the readings of two identical clocks adjacent to the events are the same, and it is known that the clocks are synchronized. However, when the clocks are not near each other, their synchronism must be defined. The result of a definition by Einstein tied to postulate 2 is that simultaneity is a relative concept. Simultaneity depends on the reference system under consideration. This relativity is at the heart of many relativistic phenomena such as time dilation. The principle of equivalence allows us to intrinsically distinguish the effects of gravity and acceleration, which is impossible on a strictly local scale. This principle is at the heart of the ability to measure many relativistic phenomena, such as the deflection of star light by gravity.

While the special and general theories of relativity have far reaching effects on how we now view the universe, the simulation of such for human viewing is not practical. The spacing between human eyes is of the order of 60–80 mm. The light from any event will arrive at each eye within about 200 picoseconds of each other, a delay that is certainly indiscernible. The optical frame rate of the human eye is more of the order of 20 $s^{-1}$. In this time light travels about 15,000 km. If the spacing between the eyes were greater than this value, light from some events would discernably arrive at one eye before arriving at the other. Depending upon the location of an event with respect to the observer, one eye would detect the event before the other.

While the prior art has reported using the special and general theories of relativity none have established a basis for a specific apparatus that is dedicated to the task of resolving the particular problem at hand. What is needed in this instance is a method for the enhanced perception of relativistic phenomena and its simulation thereof.

SUMMARY OF THE INVENTION

It is therefore one object of the invention to provide a method for the enhanced perception of relativistic phenomena and its simulation thereof.

According to the invention, an observation technique for observing relativistic phenomena by time-like separated viewing, so as to achieve the enhanced perception as a relativistic phenomena, and its simulation technique is disclosed. The observation technique includes placing two or more observation devices at time-like separated positions, obtaining data from each device characteristic of the relativistic phenomena, and viewing the data in stereo such that there is displayed the relativistic phenomena by time-like separated viewing. The simulation technique includes viewing a non-relativistic phenomena with at least one viewing device, obtaining a data vector stream at a set rate, dividing each data vector into slices, and generating two separate data vector streams for stereo viewing utilizing sequential slices of each data vector steam such that there is displayed a simulation of relativistic phenomena for time-like separated viewing. Various types of phenomena can be simulated in the present use of the invention, e.g. objects in motion or events.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

If the spacing between two positions, stationary with respect to each other in an inertial reference frame, which see the same object at relativistic velocity, is significantly large, light from that object would appear to an observer at a third position, half way between the two previous positions, to arrive at the first observer's position before arriving at the second. This separation as defined above is herein described as "time-like separated viewing" for the purposes of the present invention. The third position would see this relativistic effect even through both first and second position (in each respective frames of reference) see the exact same speed for light, that is $3.8 \times 10^8$ m/sec. Relativistic phenomena are not normally viewable by humans because of the tremendous ratios of speed, distance, and/or time that is characteristic of such phenomena. The present invention takes advantage of computer processing utilizing a stereo scanning simulation technique to simulate non-relativistic phenomena as relativistic phenomena for time-like separated viewing.

Figure 1:
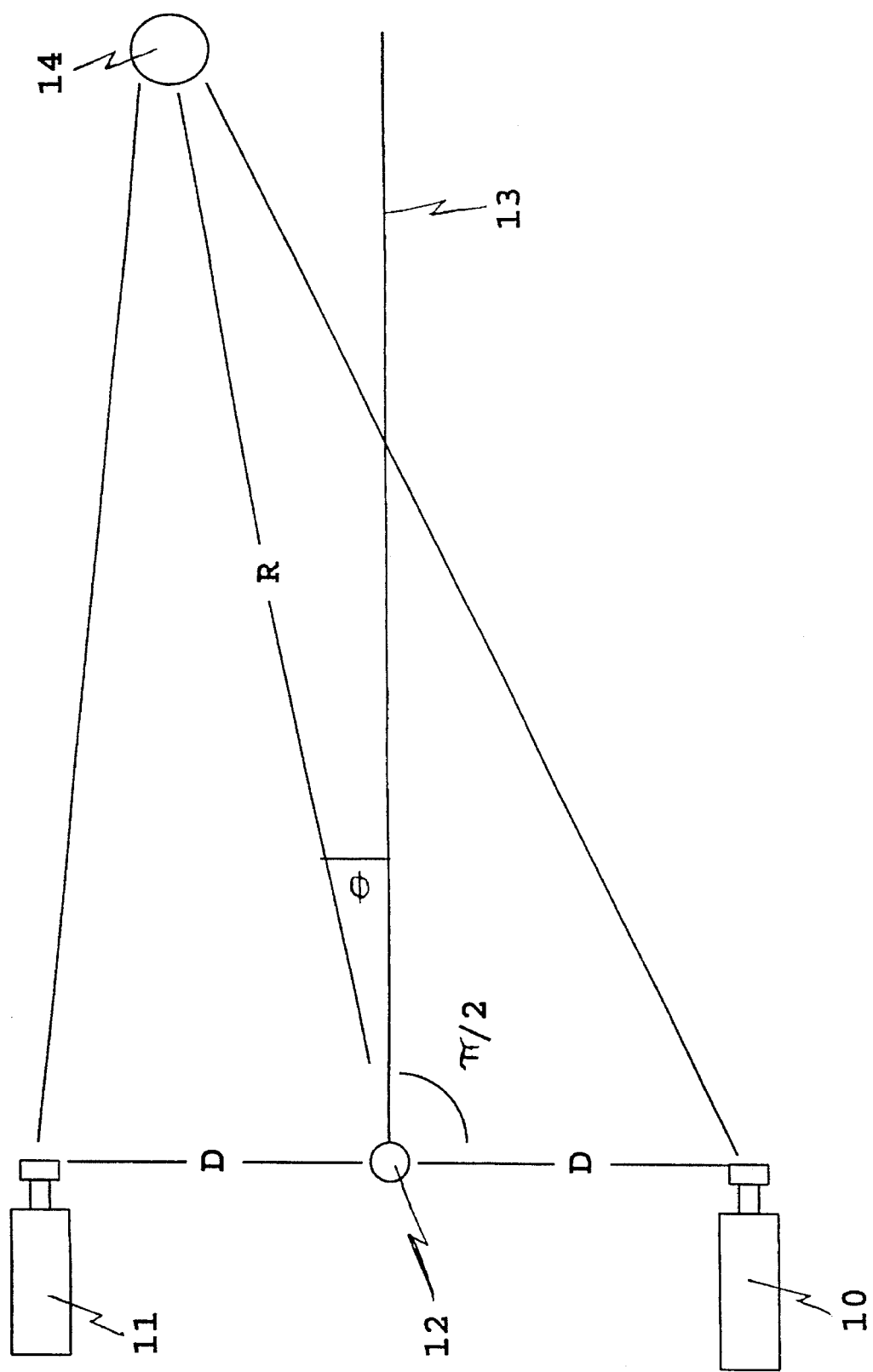
FIG. 1 is a diagram depicting the observation technique of the present invention.

Referring now to the drawings, and more particularly to FIG. 1, there is shown a diagram depicting the observation technique of the present invention. Optical devices 10 and 11 are placed at equal distance D from center point 12 along a line of sight 13 as seen in FIG. 1. A phenomena 14 is a distance R from center point 12, where θ is the angle of the event with respect to the line of sight. The time delay between what is observed between the two optical devices, corrected for the time required for information to travel from the optical devices to a comparator, is approximately:

$$(D/2c) [2-2 \cos 2\theta]^{1/2}$$

where c is the speed of light. It is understood that this approximation becomes more accurate for greater ratios of R/D. Data is obtained from each device whereby the data is viewed in stereo such that there is displayed the relativistic phenomena by time-like separated viewing.

Figure 2:
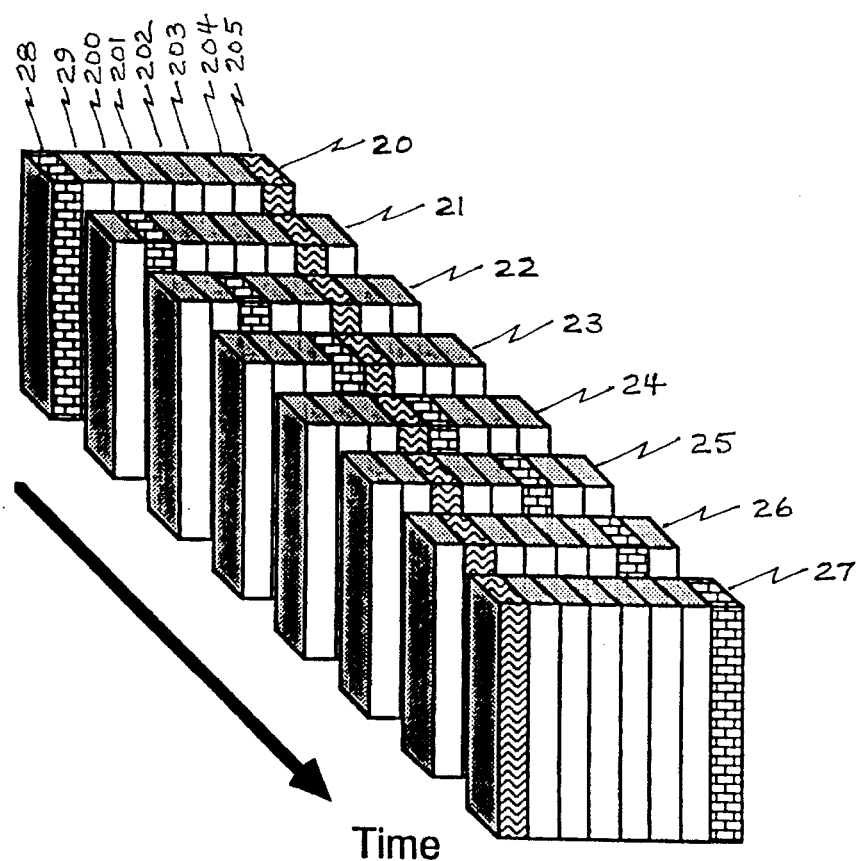
FIG. 2 is a representation of slices of the video frame rate utilizing in a stereo scanning method for the simulation technique of the present invention.

FIG. 2 is a representation of slices of the video frame rate utilizing in a stereo scanning method for the simulation technique of the present invention. This simulation technique allows for the simulation of the observation technique of FIG. 1. The technique shown in FIG. 2 utilizes a video stream output from one or more video cameras (or their equivalent), whether the phenomena is viewed in real time or recorded. N frames are recorded where each frame is divided into nth columns. Frames 20 through 27 each represent successive individual video frames of an observed event where each of the frames is divided into vertical slices 28–29 and 200–205. A video stream to be viewed by the right eye, is formed out of the original video stream in which the first frame of the new stream is formed by taking the first (left most) column of the first frame of the original stream, the second column of the second frame, etc.

The second frame of the new stream is constructed from the first column of the second original frame, the second column of the third original frame, etc. The new left channel video stream is constructed similarly. The first new frame is constructed from the nth (right most) column of the a new video stream. A general formula can be constructed for a video stream with each frame divided into n slices. The ith slice of the Nth frame in the stream is indicated as $\{N\}_{[i]}$. The Nth frame of the newly generated video stream for the right and left eyes is:

$$\{N_{new,right}\} = \sum_{i=1}^{n} \{N-1+i\}_{[i]}$$

$$\{N_{new,left}\} = \sum_{i=1}^{n} \{N-1+i\}_{[n-i+1]}.$$

Figure 3:
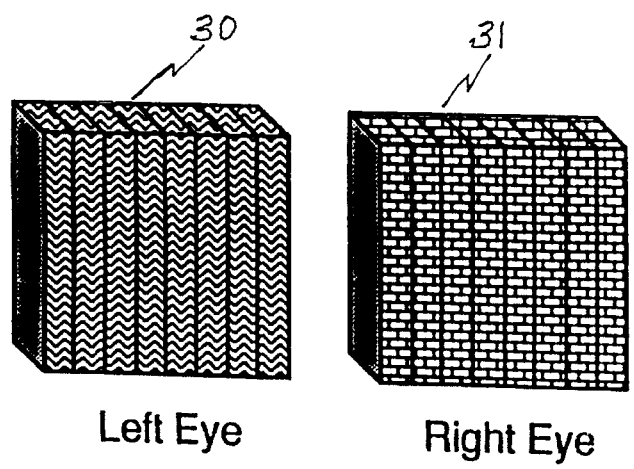
FIG. 3 is a representation of the final video frame output of the video frame rate representation shown in FIG. 2.

FIG. 3 is a representation of the final video frame output of the video frame rate representation of FIG. 2. Two new streams 30 and 31 is thus generated utilizing the method of the present invention.

Various types of phenomena can be simulated in the present use of the invention, e.g. objects in motion or events. The physical phenomenon which may be viewed or simulated in the present embodiment is a small physical sphere located off center from the zero point position and moving at a speed traverse to the visual perspective. As the object moves across the visual perspective at a non-relativistic speed, the perception, as perceived by the human eyes, would be that at all times the motion would appear linear and perpendicular to the line of sight and the object would be of a consistent size. With the use of the present technique there is the simulation of this phenomena for time-like separated human viewing, thus simulated as relativistic phenomena. The relativistic representation would be that the sphere would be seen with a linearity in motion but no longer perpendicular to the line of sight and dimensional compression along the line of motion. The velocity traverse to the observer is translated into a velocity towards and away from the observer. Acceleration of the sphere results in a variable dimensional compression as a function of velocity, and therefore an apparent curvature of motion.

An event phenomenon utilized in the present embodiment is a single light burst located off axis. As the event occurs to the visual perspective in a non-relativistic context, there would be seen a single burst of light. With the use of the present technique there is the simulation of this phenomena for time-like separated human viewing, thus simulated as relativistic phenomena. The relativistic representation would be that the light burst would be seen as two bursts of light with a temporal separation related to the angle to the centerline. It is understood that the invention is not limited to any particular phenomena.

While this invention has been described in terms of preferred embodiment consisting of relativity stereo scan system and technique, those skilled in the art will recognize that the invention can be practiced with modification within the spirit and scope of the appended claims.

Having thus described my invention, what I claim as new and desire to secure by Letters Patent is as follows:

1. A method for observing relativistic phenomena by time-like separated viewing, for enhanced perception as relativistic phenomena, including the steps of:

placing two or more observation devices at time-like separated positions;

obtaining data from each device characteristic of the relativistic phenomena;

viewing the data in stereo such that there is displayed the relativistic phenomena by time-like separated viewing.

2. A method for simulation of viewing non-relativistic phenomena as if it were relativistic phenomena, including the steps of:

viewing a non-relativistic phenomena with at least one viewing device;

obtaining a data vector stream, of both space and time components, from each device characteristic of the non-relativistic phenomena at a set rate;

dividing each data vector into slices;

generating two separate data vector streams for stereo viewing utilizing sequential slices of each data vector stream such that there is displayed a simulation of relativistic phenomena for time-like separated viewing.

* * * * *